June 9, 1931. W. B. THIEMANN 1,809,152
COMBINED FAN AND GOVERNOR FOR INTERNAL COMBUSTION ENGINES
Filed April 23, 1929
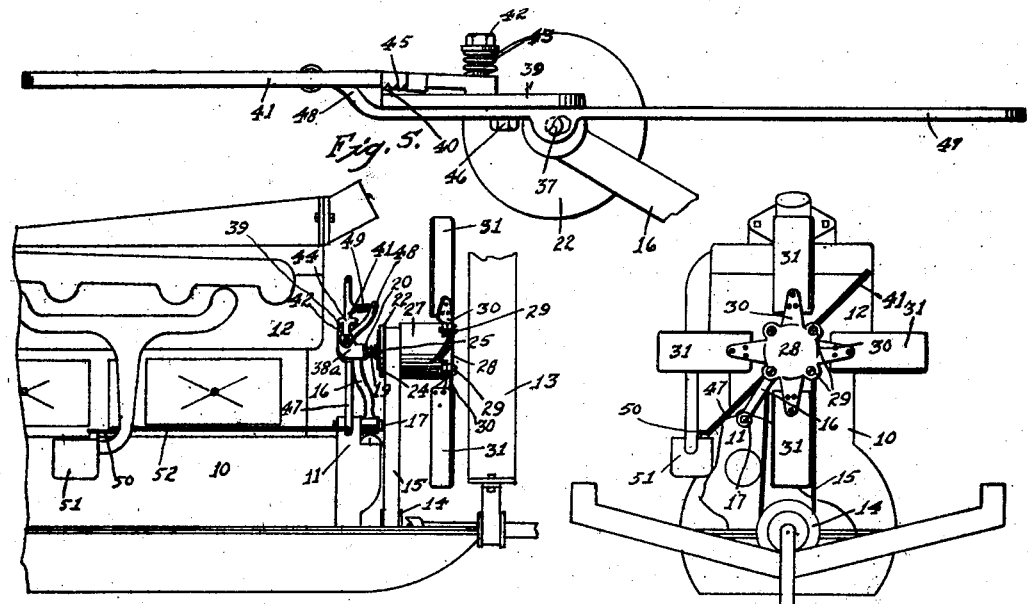
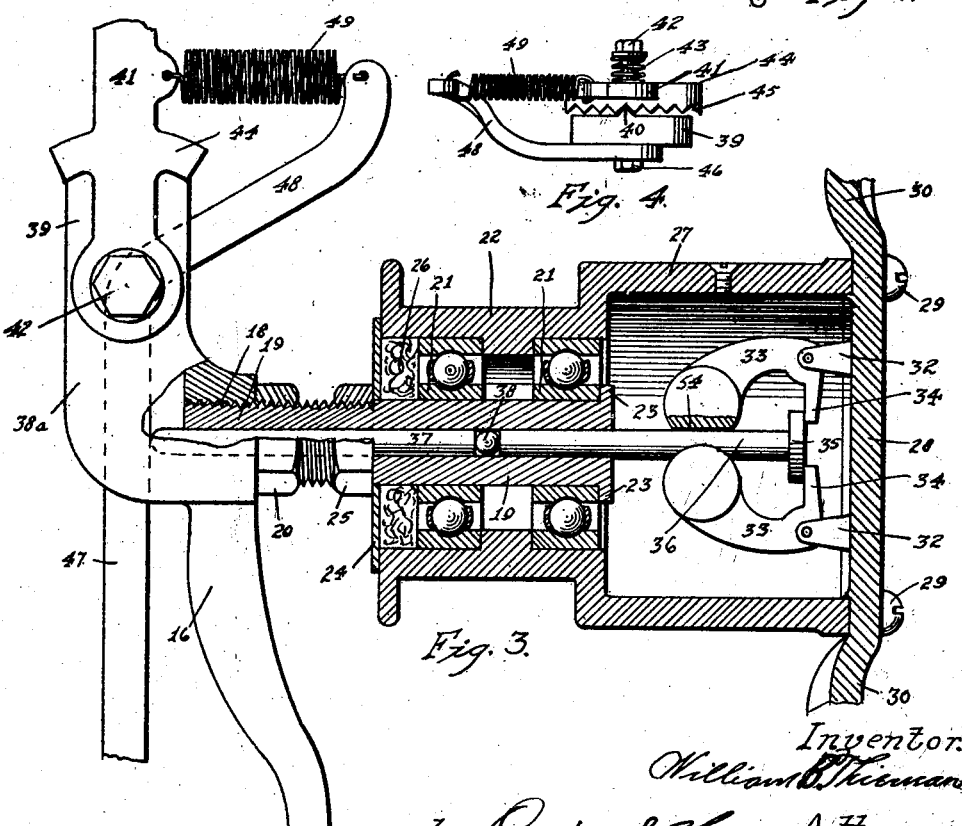
Inventor.
William B. Thiemann
by Orrin & Hogue Attorneys Patented June 9, 1931

1,809,152

UNITED STATES PATENT OFFICE

WILLIAM B. THIEMANN, OF ALBERT CITY, IOWA

COMBINED FAN AND GOVERNOR FOR INTERNAL COMBUSTION ENGINES

Application filed April 23, 1929. Serial No. 357,505.

This invention relates to improvements in automobile engines for converting the same into a stationary engine for power purposes. In converting an automobile engine into a power device, it is essential that the size of the fan be considerably increased, inasmuch as the engine is operated while stationary. It is also desirable to provide means whereby the speed of the engine may be automatically controlled, and in connection therewith means whereby the speed controlling means may be easily and quickly adjusted so the engine may be operated at a number of predetermined speeds.

It is, therefore, the object of my invention to provide a simple, durable and inexpensive device which may be easily and quickly applied to the engine without the use of special tools or mountings, to provide means for cooling and regulating the speed of the engine.

More specifically it is the object of my invention to provide a combined fan and governor device, which may be substituted for the fan already mounted on the engine, the substitute device being mounted in the same manner as the fan previously mounted, and is operated by the fan belt furnished with the engine.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of the front end of an automobile engine showing the manner in which my improved device is connected therewith.

Figure 2 is a front end elevation of the same with the radiator removed.

Figure 3 is an enlarged, detail, sectional view of the governor, and a side elevation of a portion of the throttle controlling mechanism actuated by the governor.

Figure 4 is a top view of the mechanism for adjusting the speed of the governor.

Figure 5 is a back view of a portion of the mechanism for actuating the throttle valve and the mechanism for adjusting the speed of the governor, said mechanism being shown horizontally rather than inclined.

The numeral 10 indicates the crank case of an internal combustion engine provided with a bracket 11 to which the supporting arm of the fan is attached. 12 indicates the cylinder block and 13 the radiator. The crank of the engine is provided with a belt pulley 14 having an ordinary fan belt 15.

With my improved device an arm 16 is substituted for the fan belt arm of the engine and secured in position by means of a bolt 17, which is of the ordinary construction. The upper end of the arm 16 is provided with a screw threaded opening 18 into which a screw threaded sleeve 19 is mounted and secured in position by means of a lock nut 20. The outer end of the sleeve 19 is designed to support a pair of ball bearings 21 supporting a belt wheel 22 in alinement with the belt 15 and designed to receive said belt. The outer end of the sleeve 19 is provided with a head 23 to prevent outward movement of the outer one of the bearings 21, while a washer 24 is mounted adjacent to the inner face of the pulley 22 to prevent inward movement of the pulley. Said washer is secured in position by means of a lock nut 25. A packing 26 is provided between the washer and the inner one of the bearings 21 to prevent leakage of oil.

The outer edge of the pulley 22 is provided with an enlarged hollow hub 27 having its outer end open. A plate 28 is provided for closing the open end of said hub, said plate being secured in position by means of screws 29. The periphery of the plate is provided with radially and outwardly projecting lugs 30, each of which is provided with a fan blade 31. The inner face of the plate 28 is provided with inwardly projecting lugs 32 arranged in pairs. Each pair of lugs 32 is designed to pivotally support a governor arm 33. Each of said arms 33 has an inwardly projecting portion 34 designed to engage the outer face of a disk 35 mounted on a push rod 36 slidably and rotatively mounted in the outer end of the sleeve 19. A second push rod 37 is mounted in the inner end of the sleeve 19. A ball 38 is mounted between the adjacent ends of the rods 36 and 37. The inner end of the rod 37 projects inwardly a slight distance from the arm 16. The upper end of the arm 16 is also provided with a flattened bracket 38a having an upwardly projecting portion 39. The members 38a and 39 are inclined from a perpendicular substantially at an angle of about 45°. The upper face of the member 39 is provided with a tooth 40.

Pivotally connected to the member 39 is a lever 41 pivotally mounted on a bolt 42. Said bolt 42 is provided with a spring 43 for yieldably supporting the lever 41 adjacent to the member 39. The said lever 41 is provided with a sector 44 having its inner surface provided with teeth 45 designed to be engaged by the tooth 40. The spring 43 yieldably supports the teeth 40 and 45 together.

Pivotally mounted to the under surface of the member 39 by means of a bolt 46 is a lever 47 having its upper end provided with an upwardly and outwardly extending portion 48. A spring 49 connects the upper end of the lever 48 with the lever 41 in the manner clearly illustrated in Figure 3. The said lever 47 is supported in such a manner as to be engaged by the inner end of the rod 37 so that any inward movement of the rod 37 will cause the free end of the lever 47 to move inwardly. The rod 37 and the free end of the lever 47 are moved outwardly by the tension of the spring 49. The free end of the lever 47 is operatively connected with an arm 50 of the throttle valve of a carburetor 51 by means of a rod 52.

By this arrangement it will be seen that if the engine is being operated and the pulley 14 rotated, the pulley 22 will be rotated through the belt 15, which will also cause the hub 27, the plate 28 and the fan blades 31 to be rotated. This in turn will cause the governor arm 33 to be rotated and the free ends of said arms to be thrown outwardly, which will in turn cause the rods 35 and 37 to be moved inwardly and the arm 47 actuated against the action of the spring 49, and the throttle arm 50 also actuated through the connecting rod 52, thereby providing means whereby the speed of the engine will be regulated by controlling the throttle valve. The operating speed of the engine may be varied by adjusting the tension of the spring 49 by means of the lever 41, which is accomplished by swinging the free end of the lever 41 upwardly, causing the teeth 45 to disengage the tooth 40, after which the free end of said lever may be moved either inwardly or outwardly until the desired tension is obtained, which in turn will cause the engine to operate either at a higher or lower speed.

By providing two alined push rods 36 and 37, and placing the ball 38 between them, I have provided means whereby the push rod 36 may be permitted to rotate with the inwardly projecting members 34, and thereby eliminate the wear between the inner ends of said members 34 and the member 35. The inner ends of the arms 33 are provided with grooves 54 for the purpose of receiving the rod 36 when the said arms are at their inner limit of movement. This permits the governor arms to be placed substantially together when in their closed position, so that the active angular movement of the said arms may be increased without increasing the diameter of the hub 27. It will be seen that the said arms 33 are mounted within the hub 27, which is closed by the plate 28 and provides an oil tight chamber, which may be partially filled with oil, insuring proper lubrication for the moving members, as well as lubrication for the belt pulleys 22.

By mounting the governor arms 33 within the hub of the fan, I have provided means whereby a single supporting arm 16 may be employed for mounting both the governor and the fan in position, occupying substantially the same space as was occupied by the previous fan, without having to reset the radiator or any other parts of the engine, thereby providing a combined fan and governor device, which may be easily and quickly placed in operative position, and when so placed will increase the cooling of the engine, as well as provide means whereby the engine may be operated at a number of predetermined speeds, and providing in connection therewith means for easily and quickly adjusting the operating speed.

I claim as my invention:

1. In a device of the class described, a supporting arm having an upwardly projecting member, a sleeve projecting laterally from said arm, a pulley rotatively mounted on said sleeve having a hollow hub open at its outer end, a cover plate carried by said hub for closing said opening, said cover plate having lugs projecting into the opening of said hub, the edge of said cover plate being provided with radially projecting fan blades, governor arms mounted within said hub and pivotally connected to said inwardly extending lugs, a slide rod mounted in the inner end of said sleeve and operatively connected to said governor arms, a second rod slidably mounted in the outer end of said sleeve, a ball mounted between the adjacent ends of said rods, a lever pivotally connected to the upwardly projecting member of said supporting arm, said lever being mounted in alinement with the outer one of said slide rods and designed to be engaged and operated thereby, one end of said lever being provided with a spring for yieldably supporting the lever in engagement with said rod, a second lever pivotally connected to the upwardly projecting member of said supporting arm, said second lever being connected to one end of said spring, the second lever and said upwardly projecting member being provided with serrated surfaces to yieldably lock said lever in various positions of its swinging movement.

2. In a device of the class described, an upright supporting arm having a horizontally extending sleeve portion, a rod slidably mounted longitudinally within said sleeve, a pulley rotatively mounted on said sleeve, said pulley being provided with a fan and a governor mechanism designed to impart longitudinal movement to said rod, a pivot member projecting laterally from opposite sides of said upright support, a lever pivotally mounted on one end of said pivot member having one end supported in operative relation with said slide rod, a second lever mounted on the other end of said pivot member, a spring having one end connected to the free end of the first said lever and the other end connected to the free end of said second lever, the pivoted end of the second lever having its inner surface serrated, the adjacent surface of said bracket also being provided with a serrated portion to coact with the first serrated surface, and a spring on said pivot member for yieldably supporting said serrated portions together.

WILLIAM B. THIEMANN.